(12) United States Patent
Basu et al.

(10) Patent No.: US 9,678,487 B1
(45) Date of Patent: Jun. 13, 2017

(54) SYSTEM AND METHOD FOR ALLOCATING A FIXED QUANTITY DISTRIBUTED OVER A SET OF QUANTITIES

(71) Applicant: DATAINFOCOM USA, INC., Austin, TX (US)

(72) Inventors: Atanu Basu, Austin, TX (US); Frederick Johannes Venter, Driftwood, TX (US)

(73) Assignee: DATAINFOCOM USA, INC., Austin, TX (US)

( * ) Notice: Subject to any disclaimer, the term of this patent is extended or adjusted under 35 U.S.C. 154(b) by 1106 days.

(21) Appl. No.: 13/647,965

(22) Filed: Oct. 9, 2012

(51) Int. Cl.
*G06F 3/0485* (2013.01)
*G05B 15/02* (2006.01)

(52) U.S. Cl.
CPC ............ *G05B 15/02* (2013.01); *G06F 3/0485* (2013.01)

(58) Field of Classification Search
CPC ........ G05B 15/02; G06T 15/80; G06T 17/005
See application file for complete search history.

(56) References Cited

U.S. PATENT DOCUMENTS

| | | | |
|---|---|---|---|
| 6,876,988 B2 | 4/2005 | Helsper et al. | |
| 6,917,928 B1 | 7/2005 | Pellinat | |
| 7,373,633 B2 | 5/2008 | Kraiss et al. | |
| 7,979,380 B2 | 7/2011 | Moyne et al. | |
| 8,200,527 B1 | 6/2012 | Thompson et al. | |
| 8,209,275 B2 | 6/2012 | Tsui et al. | |
| 8,917,888 B2 * | 12/2014 | Nakamura | H04H 60/04 381/102 |
| 2001/0034628 A1 | 10/2001 | Eder | |
| 2002/0006192 A1 | 1/2002 | Bengtson et al. | |
| 2002/0049621 A1 | 4/2002 | Bruce | |
| 2002/0049687 A1 | 4/2002 | Helsper et al. | |

(Continued)

OTHER PUBLICATIONS

Kenny, Peter 'novapaddy' and Clerici, Andrea. Darkest Hour Game Manual, Ver.1, published by Paradox Interactive, on Jun. 17, 2011 at https://forum.paradoxplaza.com/forum/index.php?threads/darkest-hour-manual.542573/.*

(Continued)

*Primary Examiner* — Nathan L Laughlin
*Assistant Examiner* — Jay Jung

(57) ABSTRACT

A method of allocating a fixed resource includes displaying an interface control in a user interface display. The interface control includes at least three continuous value control elements associated with a group including at least three categories. Each continuous value control element is associated with a value associated with a category of the group. The operator of the values associated with the at least three continuous value control elements is equal to a fixed quantity. In response to a first user input, a first continuous value control element is locked to fix the value associated with the first continuous value control element. In response to a second user input, a second continuous value control element is adjusted to change the value associated with the second continuous value control element. The method further includes automatically adjusting unlocked continuous value control elements of the at least three continuous value control elements other than the second continuous value control element to maintain the operator of the values associated with the at least three continuous value control elements equal to the fixed quantity.

27 Claims, 8 Drawing Sheets

(56) References Cited

U.S. PATENT DOCUMENTS

| | | |
|---|---|---|
| 2003/0177060 A1 | 9/2003 | Seagraves |
| 2004/0068429 A1 | 4/2004 | MacDonald |
| 2004/0068431 A1 | 4/2004 | Smith et al. |
| 2004/0148047 A1 | 7/2004 | Dismukes et al. |
| 2005/0004834 A1 | 1/2005 | Smith |
| 2006/0010164 A1 | 1/2006 | Netz et al. |
| 2006/0101017 A1 | 5/2006 | Eder |
| 2006/0118169 A1* | 6/2006 | Junk .................. G05B 13/024 137/82 |
| 2006/0229921 A1 | 10/2006 | Colbeck |
| 2006/0242033 A1 | 10/2006 | Corbett |
| 2006/0242035 A1 | 10/2006 | Corbett et al. |
| 2007/0106593 A1 | 5/2007 | Lin |
| 2007/0129893 A1 | 6/2007 | McColl et al. |
| 2007/0150324 A1 | 6/2007 | Makita et al. |
| 2008/0004922 A1 | 1/2008 | Eder |
| 2008/0027769 A1 | 1/2008 | Eder |
| 2008/0104104 A1 | 5/2008 | Nolan et al. |
| 2008/0140623 A1 | 6/2008 | Tien et al. |
| 2008/0183786 A1 | 7/2008 | Shimizu |
| 2008/0195440 A1 | 8/2008 | Bagchi et al. |
| 2008/0201397 A1 | 8/2008 | Peng et al. |
| 2008/0243912 A1 | 10/2008 | Azvine et al. |
| 2009/0064025 A1 | 3/2009 | Christ et al. |
| 2009/0138334 A1 | 5/2009 | Henby et al. |
| 2009/0171879 A1 | 7/2009 | Bullen et al. |
| 2009/0217183 A1 | 8/2009 | Moyne et al. |
| 2009/0319931 A1 | 12/2009 | Hutchings et al. |
| 2010/0077077 A1 | 3/2010 | Devitt |
| 2010/0114899 A1 | 5/2010 | Guha |
| 2010/0274637 A1 | 10/2010 | Li et al. |
| 2010/0332439 A1 | 12/2010 | Adachi |
| 2011/0049883 A1* | 3/2011 | Hatch .................. F03D 7/043 290/44 |
| 2011/0071867 A1 | 3/2011 | Chen et al. |
| 2011/0213644 A1 | 9/2011 | Phene |

OTHER PUBLICATIONS

McCullagh, Explore Lightroom 4: A Roadmap for Photographers, 1st Edition; Publisher: Cengage Learning PTR; (Jun. 18, 2012).*
"Altaworks Selected by Industry Influencers to Demonstrate at DEMO 2002 Conference"; Business/Technology Editors; Business Wire; New York; Jan. 16, 2002; p. 1; Proquest.
"Fonterra Canpac Deploys Pavilion's Production Performance Management Solution: Fast Moving Consumer Goods Manufacturer Improves Operational Performance and Reduces Waste"; Business Wire; New York; May 23, 2006; p. 1; Proquest.
"Performance—Measurement & Small to Mid-sized Call Center Solutions"; Call Center Solutions; Mar. 1999; 17, 9; ProQuest Central; p. 22.
"Predictive Analysis with SQL Server 2008"; White Paper; Microsoft SQL Server 2008 R2; Nov. 2007.
Bauer; "Predictive Analytics: Data Mining with a Twist"; DM Review 15.12; Dec. 2005; p. 76.
Bauer; "Predictive Analytics: The Next Wave in KPI's"; DM Review; Nov. 2005.
Cheisa et al; "How do measurement objectives influence the R&D performancee measurement system design:"; Management Research News; 30(3); pp. 182-202; doi:10.1108/01409170710733269.
Colias; "New Statistical Tools for Key Driver Analysis"; Decision Analyst; 2007.
Fair ISAAC Corp.; Decision Management Tools-Xpress OptiMIzer; Product Sheet; 2008; 2 Pgs.
Fair ISAAC Corporation; "Predictive Analytics: Custom Insurance Analytics"; Product Sheet; 2008; 2 pages.
Frangopol et al.; "Probabilitic Performance Prediction of Deteriorating Structures Under Different Maintenance Strategies: Condition, Safety and Cost"; Apr. 2004.
Holland; "Achieving a step change in contact centre performance: Exploiting data to make better decisions and take effective action"; Journal of Targeting, Measurement and Analysis for Marketing, vol. 12, 2, pp. 103-113.
Keeley; "Root Cause Analysis Research Corner Cause and Effect"; Call Center Magazine; Mar. 2005.
Lawson et al; "Socrecards and dashboards-partners in performance"; CMA Management; Dec./Jan. 2007.
Loucks; "Model Sensitivity and Uncertainty Analysis"; Water Resources Planning and Management; UNESCO; 2005; http://ecommons.library.cornell.edu/bitstream/1813/2804/12/09_chapter09.pdf.
Marr; "Measuring and managing intangible value drivers"; Business Strategy Series; 8(3); 2007; pp. 172-178.
Palfreyman;"Performance Indicators and Reporting: Some practical guidelines"; 1998; Charter. 69 (4), pp. 85-86.
SAS Institute Inc., "How to Compete on Analytics: The Analyitical Center for Excellence"; White Paper; 2008; 18 pages.
SAS Institute Inc., Ngenera Corporation, and Intel; "Sucessful Automating Decisions with Business Analytics: How to Identify High-Value Opportunities for Embedding Analytics into Your Business Processes"; White Paper; 2008; 22 pages.
SAS Institute Inc.; Enhancing Sales and Operations Planning with Forecasting; White Paper; 2008; 14 pages.
SAS Institute: "Data Driven Decision Making: Analyzing Your Data to Improve Student Learning"; White Paper; 2008; 19 pages.
SAS Institute; "Data Management for Risk: The Importance of Data for Effective Risk Management"; White Paper; 2009; 11 pages.
SAS Institute; "The SAS Enterprise Intelligence Platform: SAS Business Intelligence; Enabling BI Consolidation and Standardization Without Comprises"; White Paper; 2008; 13 pages.
SPSS Inc.; "Clementine® 12.0 Specifications; Achieve Better Insight and Prediction with Data Mining"; Product Specificiations; 2008; 6 pages.
SPSS Inc.; "Get More Out of Your Analyitical Investment"; Advertisement; 2008; 2 pages.
Wen et al.; "Utilizing the Balanced Scorecard for Performance Measurement of Knowledge Management"; Journal of Accounting, Finance & Management Strategy, 3(2), pp. 39-58.
Non-final Office Action mailed Sep. 14, 2011 in U.S. Appl. No. 12/404,568.
Final Office Action mailed Jan. 30, 2012 in U.S. Appl. No. 12/404,568.
Notice of Allowance mailed Apr. 11, 2012 in U.S. Appl. No. 12/404,568.
Notice of Allowance mailed Oct. 3, 2012 in U.S. Appl. No. 13/019,446.
Non-Final Office Action mailed Oct. 12, 2012 in U.S. Appl. No. 13/487,715.
Notice of Allowance mailed Jun. 6, 2013 in U.S. Appl. No. 13/487,715.
Notice of Allowance mailed Mar. 18, 2014 in U.S. Appl. No. 13/487,715.

* cited by examiner

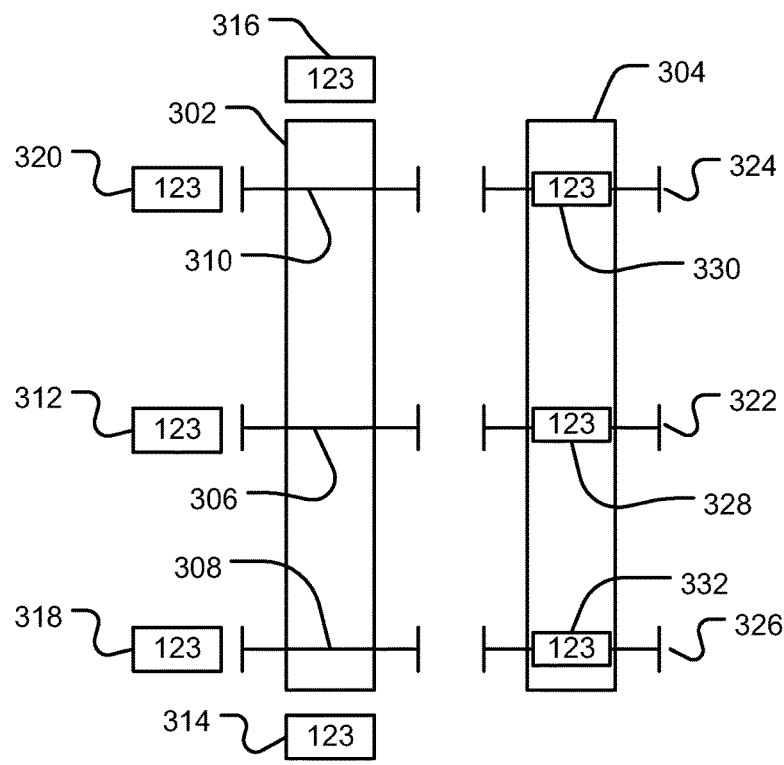
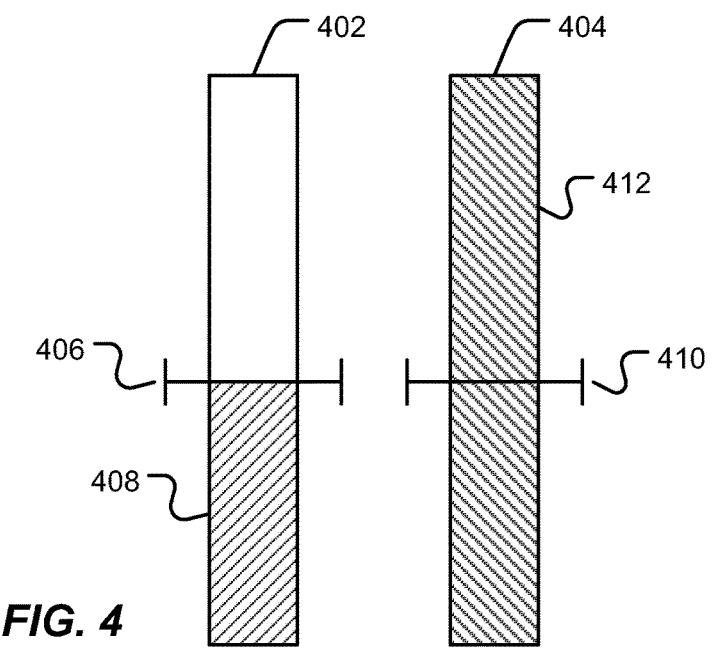

SYSTEM AND METHOD FOR ALLOCATING A FIXED QUANTITY DISTRIBUTED OVER A SET OF QUANTITIES

FIELD OF THE DISCLOSURE

This disclosure, in general, relates to systems and methods for allocating amounts of a fixed asset or resource between a set of entities.

BACKGROUND

Increasingly, industry is relying on automation and computer-based analysis, such as Prescriptive Analytics™ techniques, to improve business processes. In particular, businesses can use computer systems to allocate resources, predict the influence of such resource allocation on future business performance and prescribed improved resource allocations to enhance future business performance. For example, businesses can allocate among call centers to handle call traffic, server systems to attend Internet traffic, manufacturing resources, budgets, or any combination thereof. In particular, resources and supply can be limited. As such, allocations of a resource or supply to one entity can influence the allocation provided to another entity.

SUMMARY

A method of allocating a fixed resource includes displaying an interface control in a user interface display. The interface control includes at least three continuous value control elements associated with a group including at least three categories. Each continuous value control element is associated with a value associated with a category of the group. An operator of the values associated with the at least three continuous value control elements is equal to a fixed quantity. In response to a first user input, a first continuous value control element is locked to fix the value associated with the first continuous value control element. In response to a second user input, a second continuous value control element is adjusted to change the value associated with the second continuous value control element. The method further includes automatically adjusting unlocked continuous value control elements of the at least three elements other than the second continuous value control element to maintain the operator of the values associated with the at least three continuous value control elements equal to the fixed quantity.

An exemplary user display includes an interface control including at least three continuous value control elements associated with a group including at least three categories. Each continuous value control element is associated with a value associated with a category of the group. An operator of the values associated with the at least three continuous value control elements is equal to a fixed quantity.

BRIEF DESCRIPTION OF THE DRAWINGS

The present disclosure may be better understood, and its numerous features and advantages made apparent to those skilled in the art by referencing the accompanying drawings.

FIG. 2, FIG. 3, FIG. 4, FIG. 5, and FIG. 6 include illustrations of exemplary interface controls.

The use of the same reference symbols in different drawings indicates similar or identical items.

DETAILED DESCRIPTION

In an exemplary embodiment, a computational system can implement an interface control for allocating a fixed or limited resource or asset. For example, the interface control can be displayed in a user interface display. The interface control includes continuous value control elements associated with a group of entities or categories. The continuous value control element is a control element that can represent many values within a range. An exemplary continuous value control element includes a slide element, a dial, or a combination thereof, and a user input to the continuous value control element can include direct input e.g., (text input), keyboard input (e.g., up or down arrows), gesture inputs, mouse inputs, voice inputs, video inputs, network inputs, digital or analog inputs from devices connected to the display or a combination thereof. The operator of values associated with the continuous value control elements is equal to a fixed quantity associated with the fixed or limited resource or asset. The operator is a value of a function, such as a sum, of the values associated with the continuous value control elements. Each continuous value control element is associated with a value associated with a category or entity of the group. In response to user interaction, one or more of the continuous value control elements can be set or fixed in value (i.e., locked). A user can further interact with the interface control to adjust the value associate with another continuous value control element that is not locked. Further, the system automatically adjusts continuous value control elements that are not locked to maintain the operator of the values associated with the continuous value control elements equal to the fixed quantity associated with the fixed or limited resource or asset. In an example, the fixed quantity can be expressed as a percentage in the continuous value control elements, adding to 100%. In another example, the fixed quantity can be a stated amount of a resource. When automatically adjusting unlocked continuous value control elements, the unlocked continuous value control elements can be adjusted by the same quantity to compensate for the adjustment of a manipulated continuous value control element. In another example, the quantities of unlocked continuous value control elements can be adjusted to maintain a ratio between the unlock continuous value control elements not being manipulated.

Figure 1:
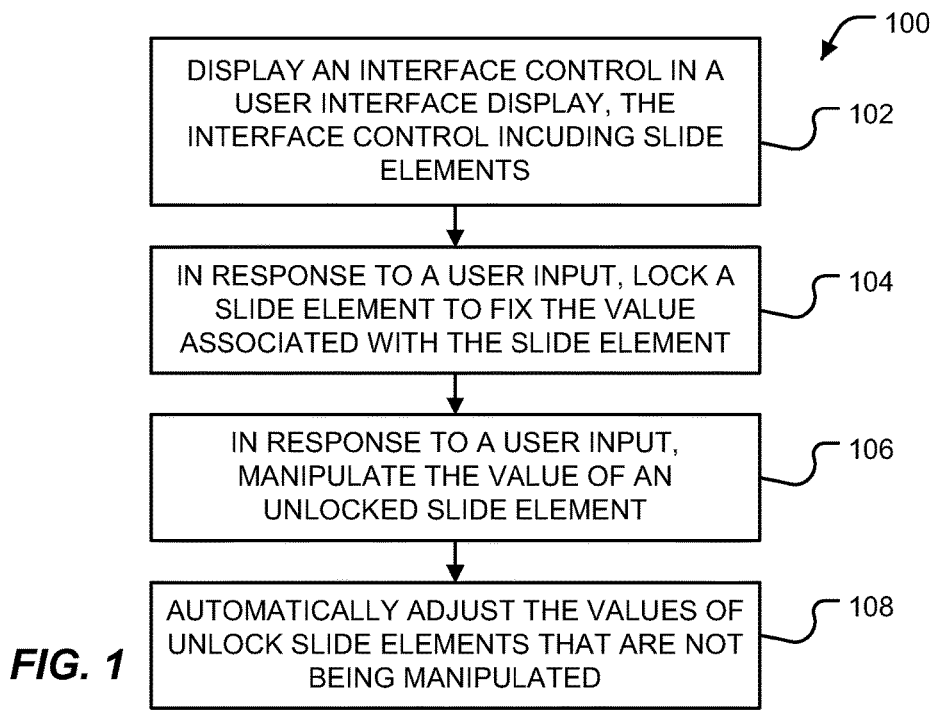
FIG. 1 includes a flow diagram illustrating an exemplar method.

As illustrated in FIG. 1, a method 100 includes displaying a computer-implemented interface control in a user interface display, as illustrated at 102. The user-interface control can be associated with an asset or resource having a fixed or limited amount to be distributed among entities or categories of a group of entities or categories. The user interface control can include continuous value control elements, such as slide elements. For example, the user-interface control can include at least three continuous value control elements. Each continuous value control element can be associated with an entity or category within the group. For the purpose of discussion, the continuous value control element is represented as a slide element.

Figure 2:
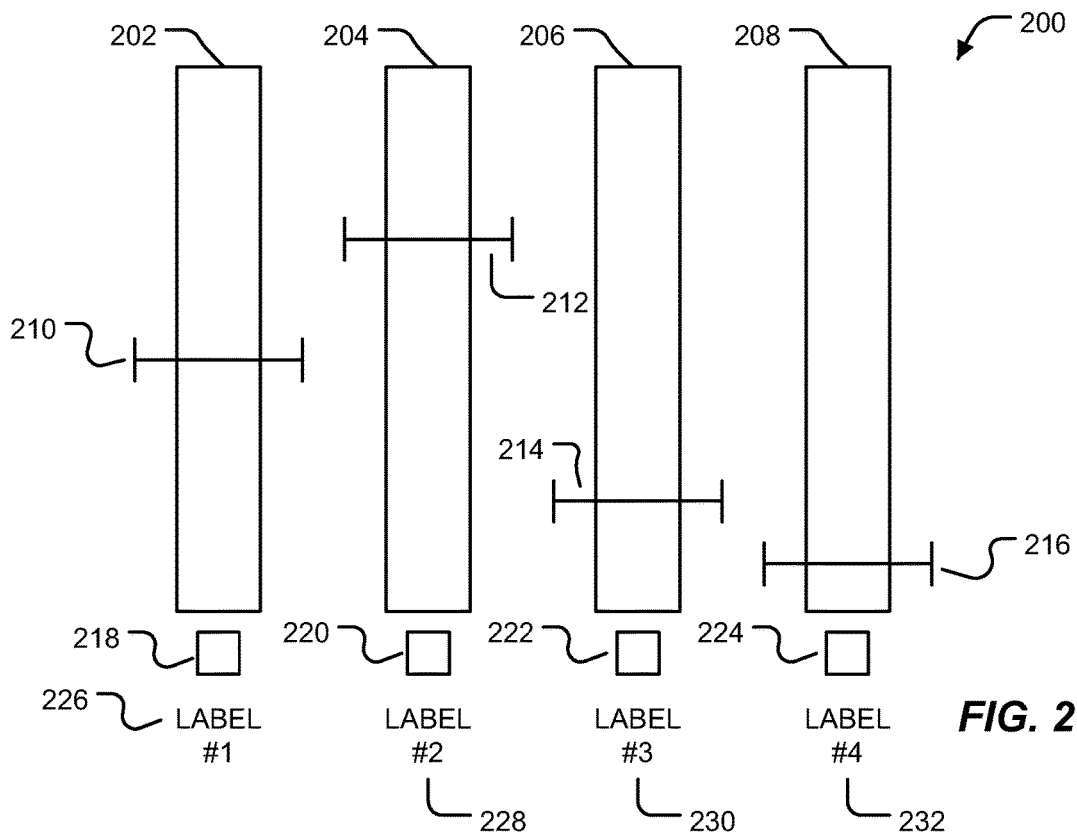

For example, FIG. 2 includes an illustration of an exemplary interface control 200 including at least three slide elements, such as the illustrated four slide elements. For example, the user interface control 200 includes four slide elements 202, 204, 206, and 208. Each of the slide elements 202, 204, 206, or 208 is associated with an entity or category of a group of entities or categories to which the fixed resource or asset is to be distributed, for example, as indicated by respective labels 226, 228, 230, or 232. As illustrated, the labels 226, 228, 230, or 232 are displayed below the slide elements 202, 204, 206, or 208. Alternatively, the labels can be displayed adjacent the slide elements, above the slide elements, within the slide elements, or any combination thereof.

Each of the slide elements 202, 204, 206, or 208 includes a slide 210, 212, 214, or 216. The position of the slide 210, 212, 214, or 216 indicates a value associated with the amount of the fixed resource or asset assigned to the category or entity associated with the slide element. To change the amount of the resource or asset allocated to a particular entity or category, a user can manipulate the position of the slide within the slide element. Because the amount or availability of the fixed resource or asset is fixed or limited, the values associated with other slide elements not being manipulated can be automatically adjusted so that the value represented by the operator of the values of all of the slide elements represents the fixed or limited amount of the resource or asset. The operator is a value of a function, such as a sum, of the values associated with the continuous value control elements.

In particular circumstances, a user may want to fix or set a value associated with a slide element and may want to manipulate other slide elements while the set element remains fixed in value. As such, the user can lock the slide element. The value of the slide element remains fixed or unchanged when other slide elements are manipulated. As such, slide elements of the set of slide elements can be locked to set or fix the value associated with the particular locked slide element. For example, each of the slide elements 202, 204, 206, or 208 can include a lock element, such as a binary value control element, such as lock element 218, 220, 222, or 224. As illustrated, the lock elements 218, 220, 222, or 224 are checkboxes that can be activated or deactivated to lock or unlock an associated slide element. By locking a slide element, the value associated with the slide element is fixed or set and does not automatically adjusted in response to manipulation of other slide elements. While the illustrated interface control 200 includes checkbox style locking elements, alternative methods for locking a slide element can include double-clicking on the slide element, double-clicking on the slide, a checkbox positioned on or adjacent the slide of the slide element, or utilizing other keystrokes, mouse manipulations, gesture controls, or any combination thereof. Alternatively, other binary value control elements can be used. An exemplary binary value control element includes a checkbox, toggle button, radio button, or any combination thereof. For discussion purposes, the locking element is illustrated as a checkbox.

The slide element can be unlocked by unchecking the checkbox associate with slide element or by other mechanisms such as double-clicking the slide element. In an unlocked state, the value of the slide element can be manipulated by user or automatically adjusted in response to manipulation of other unlocked slide elements.

Other values associated with slide element, such as an upper bound associated with the slide element or a lower bound associate slide element, can be illustrated. For example, FIG. 3 illustrates slide elements 302 and 304. As illustrated by slide element 302, the value of the slide 306 can be provided in a text box 312 adjacent the slide 306. Alternatively, as illustrated at 304, the value of the slide 322 can be included in a text box 328 within the slide element in proximity to the slide element 322. Optionally, a value can be directly entered into the text box 312 or 328.

Upper or lower bounds associated with the slide element can also be displayed in text boxes. For example, the slide element 302 illustrates an upper bound in a text box 316 above the slide element 302 in proximity to the top of the slide element 302 and illustrates in a text box 314 for the lower bound of the slide element 302 adjacent the bottom of the slide element 302. Optionally, the values illustrated in text boxes 316 and 314 can change based on the available range of values available for the slide element given that the value associated with other slide elements is fixed or set when other slide elements are locked. As such, the value or range of values available for manipulating a particular slide element can be limited by the value associated with locked slide elements.

In a further example, the slide element, such a slide element 302, can include an upper bound slide 310 and a lower bounds slide 308 that are automatically adjusted based on the available range of values to which the slide 306 can be manipulated based on limits set by the fixed or set values of locked slide elements. For example, an upper bound slide 310 can move up or down in response to locking or unlocking other slide elements. The available value associated with the upper bound slide 310 can be displayed in a text box 320 disposed proximately to the upper bound slide 310. Similarly, the lower bound slide element 308 can move up and down in response to locking or unlocking other slide elements and the value associated with the lower bound slide 308 can be displayed in a text box 318 proximal to the lower bound slide 308.

As illustrated in the slide element 304, the text boxes associated with upper bound and lower bound slides can be disposed within the slide element. For example, an upper bound slide 324 can include a text box 330 disposed within the slide element 304 in proximity to the upper bound slide 324. The lower bound slide 326 can include a text box 332 disposed within the slide element 304 in proximity to the slide 326. As an alternative to the upper and lower bound slide elements, the size of the slide element 302 can be manipulated or the range that is available can be displayed in text boxes 314 or 316.

Returning to FIG. 1, a slide element of the set of slide elements can be locked in response to user input, as illustrated at 104. Locking the slide element fixes the value associated with slide element and prevents the slide element's value from being manipulated in response to the manipulation of other slide elements. In particular, the slide element can be locked by changing the state of a binary value control element. A binary value control element can have one of two states. An exemplary binary value control element includes a checkbox, a toggle button, a radio button, or a control that can vary between two states. For example, as illustrated in FIG. 2, a binary value control element, such as the lock checkbox 224, can be checked, fixing or setting the value associated with slide element 208 and preventing the value from changing in response to manipulation of other unlocked slide elements, such as slide elements 202, 204, and 206.

When a slide element is locked, the interface control can provide a visual indication that the slide element is locked. For example, the slide element can change color, change fill pattern, or otherwise have a visual indication that the slide element is locked in contrast to being unlocked. For example, as illustrated in FIG. 4, an unlocked slide element 402 can include a visual indication. For example, the slide element can be a single color or have a single fill pattern. In another example, the slide element can include a fill pattern or color 408 disposed below the slide 406 that is different from a pattern or color of the slide element above the slide 406. When locked, the pattern or color can change. In another example as illustrated by slide element 404, the entire slide element can be filled with a color or pattern 412 to indicate that the slide 410 and its associated value are set or fixed and the slide element 404 is in a locked state.

Returning again to FIG. 1, the value of an unlocked slide element can be manipulated in response to user input, as illustrated at 106. For example, a user can manipulate a slide of the slide element using a mouse by clicking on the slide and dragging the slide up or down within the boundaries of the slide element. In an alternative example, a user can click on a text box and enter a value. In a further alternative example, the user can select the slide element using a keystroke, such as a tab key, and can manipulate the slide element using another key, such as up-and-down arrows.

As illustrated at 108, the values of unlocked slide elements that are not being manipulated by a user can be automatically adjusted in response to the manipulation of the manipulated slide element to maintain a operator that is associated with the fixed quantity associated with the fixed or limited asset or resource. In an example, the value of unlocked slide elements that are not being manipulated can be changed by equal amounts provided that one or more of the unlocked slide elements has not reached a boundary. In another example, the one or more slide elements that are not locked and not being manipulated can be automatically adjusted to maintain a ratio between the unlocked slide elements not being manipulated. In a further example, other algorithms can be used to determine how much unlocked slide elements that are not being manipulated are changed in value in response to manipulation of an unlocked slide element to maintain the operator of the fixed quantity.

Figure 5:
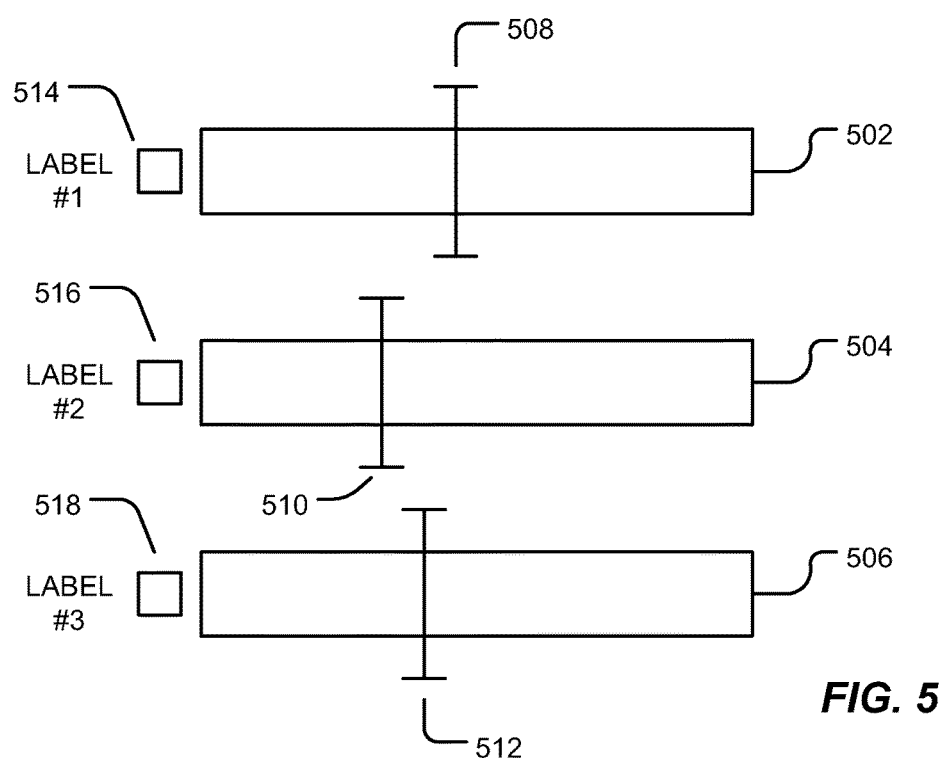
Figure 6:
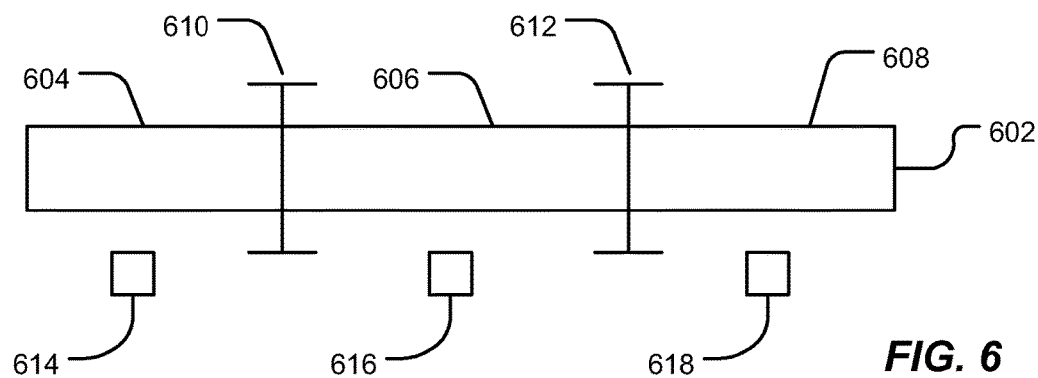

FIG. 2 illustrates the slide element of the interface control 200 in a vertical configuration, including at least three columns, such as the illustrated four columns of slide controls. Alternatively, such an interface control can be implemented that displays slide elements in other configurations. For example, in a vertical configuration, slide elements can be stacked on top of each other in a single column. Alternatively, as illustrated in FIG. 5 and FIG. 6, the interface control can be implemented in a horizontal configuration in which the slide elements are disposed horizontally and the slides are manipulated left or right instead of up and down. For example, as illustrated in FIG. 5, slide elements 502, 504 and 506 are positioned horizontally in separate rows. The slides 508, 510, or 512 of the slide elements 502, 504 or 506 can be manipulated left and right instead of up and down. The slide elements can similarly include labels positioned adjacent to the slide elements 502, 504, or 506 and can include a locking mechanism, such as checkboxes 514, 516, and 518, positioned adjacent the slide element 502, 504 and 506. As illustrated in FIG. 5, the slide elements are disposed in separate rows, such as at least three rows.

In another example illustrated in FIG. 6, the interface control can be implemented as a horizontal control including a single row 602 in which the row 602 includes more than one slide element 604, 606, and 608. By manipulating the slides 610 or 612, the values associated with a particular category can be manipulated. Category labels can be included within the slide elements 604, 606, or 608, below the slide elements, or above the slide elements. The row 602 of the interface control can include slide elements 604, 606, or 608, representing three or more entities or categories. The value associated with the entity or categories can be manipulated by moving the slides 610 or 612. The value associate with anyone category can be locked using a locking mechanism, such as a binary value control element, e.g., checkboxes 614, 616, or 618.

In a particular example, the interface control can be instantiated by supplying to an object or routine a number of categories, names of the categories, and the fixed quantity or quantity type. For example, a four slide element control can be implemented by supplying four categories and an indication that the operator, such as the sum, of the values associated with the categories should add to 100%. In another example, a five element control can be implemented by supplying five categories and a fixed value associated with the operator of the categories.

Optionally, initial values associated with the categories can be provided. In another example, an adjustment algorithm can be selected. In a further example, an interface orientation can be supplied. In an additional example, locked or unlocked initial states can be provided to instantiate the interface control.

In an embodiment, an exemplary interface control can be used to allocate internet traffic to servers. For example, each server can be allocated a percentage of internet traffic. In another example, an interface control can be provided to allocate calls between call centers. Such controls can further be used in systems for budgeting and other resource allocation.

In particular, the interface control can be used in a system for predicting business performance and prescribing solutions to business problems. In an example, the interface control can be associated with an allocation of resources at a future time period. For example, the interface control can relate to call center allocations next week, next month, or at a next business period.

For example, the interface control can be used in methods described below to implement Prescriptive Analytics® techniques that assist with determining future actions or decisions in view of business rules and projected outcomes. The methods can be embodied in executable instructions, processors or systems to execute such instructions, interfaces implemented by such systems, media storing such executable instructions, and services derived from the use of such methods and systems. In addition, the methods can be utilized to provide Predictive Decision Management® information and services, such as Decision as a Service™ services. In particular, the methods can implement predictive analysis, such as forecasting to determine what will happen when. Further, the methods can implement optimization, scenario testing, and root cause analysis of factors that influence performance.

In an embodiment, a system predicts problems that can occur, providing an indication of both the nature of the problem and when it is expected to occur. The problems can be expressed as deviations in performance indicators that violate business criteria. For example, a problem can be expressed as the value of a performance indicator crossing a threshold. In addition, the system supports testing of solutions to the predicted problem. The solutions are expressed in terms of what action to take and when to take such action. As such, the system assists with determining a desirable set of future actions to maintain a business process in compliance with business criteria. Deviations from performance indicators that violate business criteria can also include opportunities that the business can benefit from. For example, when a future customer satisfaction score exceeds a threshold, the business can decide to reduce its service level and thus, reduce cost.

Businesses rely on business processes to function. Evaluating how well that business process is performing allows a business to allocate resources, increase production, improve its position in the market place, increase profitability, or any combination thereof. For example, a business process can include a call center, the function being customer service or technical support. In another example, the business process can include field services, the function being product installation or repair. In a further example, the business process can be a marketing department, the function being to control public perception of the business or a response rate. In additional examples, the business process can include transactions services, finance and accounting, manufacturing, logistics, sales, or any combination thereof.

In particular, evaluation of the business process can be correlated with performance indicators (PIs). One or more performance indicators (PIs) can be used to quantify how well a business process is performing. For example, a call center can quantify performance using performance indicators, such as customer satisfaction, problem resolution, productivity indicators, cost indicators, or any combination thereof.

Once determined, the performance indicators (PIs) can be compared with business criteria to determine whether the business process is performing as desired. For example, a business criterion can include threshold values, limits on rates of change, heuristics associated with aspects of the business function or any combination thereof. For example, the performance indicator (PI) can be compared to a threshold value to determine whether the performance indicator (PI) is within a desired range or is in violation of the threshold, indicating poor performance or an unnecessary high performance.

The performance indicators (PIs) are influenced by other factors associated with performing the business process. In particular, such factors are referred to as influencers and influencers correlate with the performance indicators. For example, an influencer associated with call center performance can include the number of contacts made with a customer to resolve an issue, the type of issue, hold time, shipping delays, or any combination thereof, among others. Such influencers can, for example, influence performance indicators, such as customer satisfaction and brand satisfaction. Performance indicators (PIs) or influencers can be of numerical (continuous) nature, categorical nature, or a combination thereof. Further, the PIs or influencers can be ordered or can be non-ordered. In another example, the distributions of performance indicators (PIs) or influencers are utilized or predicted. In particular, a PI distribution provides data about the underlying nature of the median or mean value. For example, when the PI relates to customer satisfaction, an average value does not provide information about the number of dissatisfied customers. An average of 80% satisfaction can be the result of all participants having a satisfaction near 80% or can be the result of several 100% satisfied customers and a few very dissatisfied customers. Identifying the existence and then cause of the few very dissatisfied customers can provide greater benefit than seeking to achieve an average value. In the case of categorical performance indicators (PIs) or influencers, such a prediction can include the prediction of the occurrence set of categories. As used below, the term "value" is used to include numerical values, categorical values, or any combination thereof.

The influencers and the performance indicators (PIs) change over time. The change can be caused by the change of influencers or by a time dependency of a performance indicator on itself. As such, the performance indicator (PI) can deviate overtime and violate business criteria, which is indicative of a problem in the business unit or low performance. To correct the deviation, associated influencers can be manipulated. For example, more staff can be added to reduce hold time. However, immediate manipulation of the influencers to solve a problem predicted in the future can provide less than desirable solutions to the problems in the business process. For example, hiring more staff long before the hold times are expected to increase leads to higher cost in the call center. The present system can assists with determining a desirable set of future actions to maintain a business process incompliance with business criteria.

Figure 8:
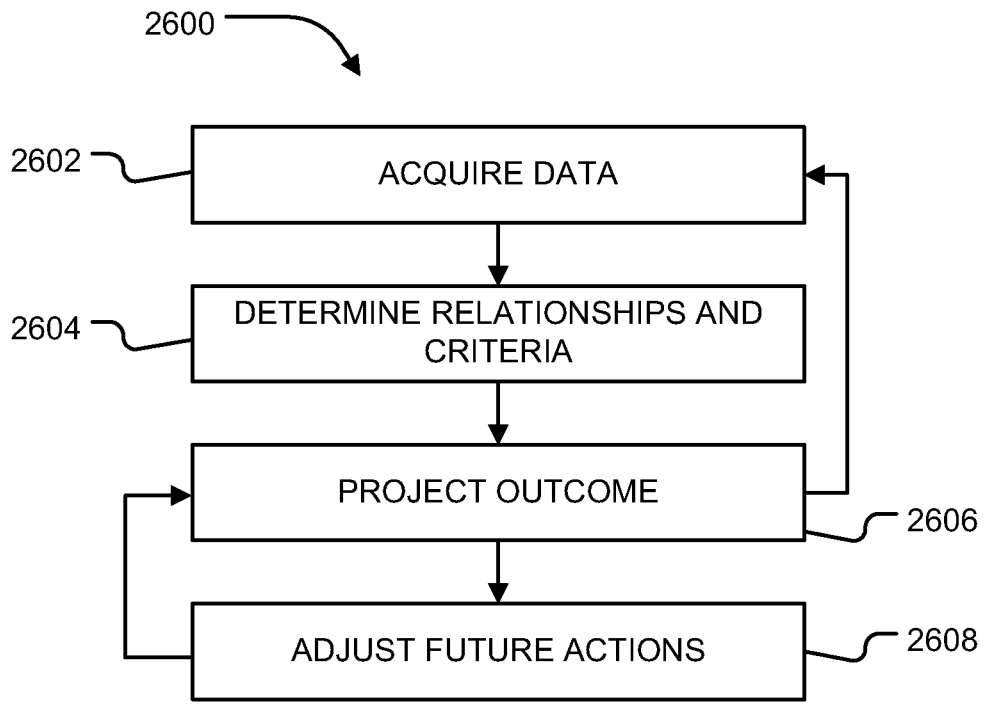
FIG. 8 includes an illustration of a flow diagram of an exemplary process.

In an embodiment, the present system performs a method to determine such a desirable set of future actions. For example, FIG. 8 illustrates a method 2600, which includes acquiring data (2602), determining relationships and criteria (2604), predicting outcomes (2606) and adjusting future actions (2608). The present system can acquire data, as illustrated at 2602, from a variety of sources. The data can be acquired from external sources. Exemplary external sources include databases, customer service logs, surveys, testing, or any combination thereof, among others. In particular, the data can be derived from structured sources. In another example, the data can be derived from unstructured sources. The data can be transformed and aggregated. In addition, the data can be cleaned. The resulting data can be stored in a data management system.

In an example, the system can also use streaming data sources where there is no intermediate data management system for the storage of aggregated data. Such a system is especially useful for big unstructured data sets (terabyte data) where the use of a rational database management system would be inefficient or economically unacceptable. In such an example, techniques such as Map/Reduce are applied based on Big Data processing systems like Apache Hadoop.

Once clean aggregated data is available, relationships between performance indicators and potential influencers can be determined and criteria for performance can be established, as illustrated at 2604. Such relationships permit projection of potential outcomes, which can be compared with the criteria to determine whether the business process is functioning well. In particular, the relationships can identify influencers that have a greater influence on one or more performance indicators.

As illustrated at 2606, outcomes can be projected. Projecting can include predictive analysis to determine what is to happen. Predictive analysis can include forecasting to determine what is to happen and in what time frame. In particular, such projection can include projecting the value of one or more performance indicators based on the determined relationships and expected values of influencers. In a further example, the future values of one or more influencers are projected, and the performance indicators are determined based at least in part on the future values of the one or more influencers. Projecting, and in particular, forecasting can be performed using an algorithm constrained with business rules. For example, the values of influencers or performance indicators can be constrained based on rules established by the business. In an example, one or more of the performance indicators are projected to violate one or more business criteria at future times. For example, the value of a performance indicator can cross a threshold at a future time step. In this way, the business process is provided with warning about a potential problem that may arise in the future.

The present system can also permit adjustment of future actions, as illustrated at 2608. For example, to determine a solution to a projected problem, the system can adjust, in an automatic mode or through manual adjustment, the future value of one or more influencers. The performance indicators can be projected using the adjusted influencer values to determine whether the problem is solved. In particular, the adjustment to influencer values can be made at one or more future time steps. As such, minor adjustments to an influencer value can be made during a series of time steps. In another example, a large adjustment can be made at a single time step closer to the projected violation of the business criteria. The process can be iterated to determine a particularly advantageous set of future actions that maintain the performance indicators at desired states. In particular, a performance indicator can be optimized by adjusting one or more values of the influencers. As used herein, optimizing is a process of adjusting values to meet or approach a criterion. Further, the process can be constrained based on business rules. For example, business rules can set boundaries to the values of influencers or performance indicators.

In addition, the future actions and data derived therefrom can be used to recalibrate the system. For example, new results relating actions taken can be used to inform the algorithm and for selection of an algorithm. Other processes, such as iteratively adjusting or optimizing or root cause analysis, can be performed automatically or continuously in response to new data.

Figure 9:
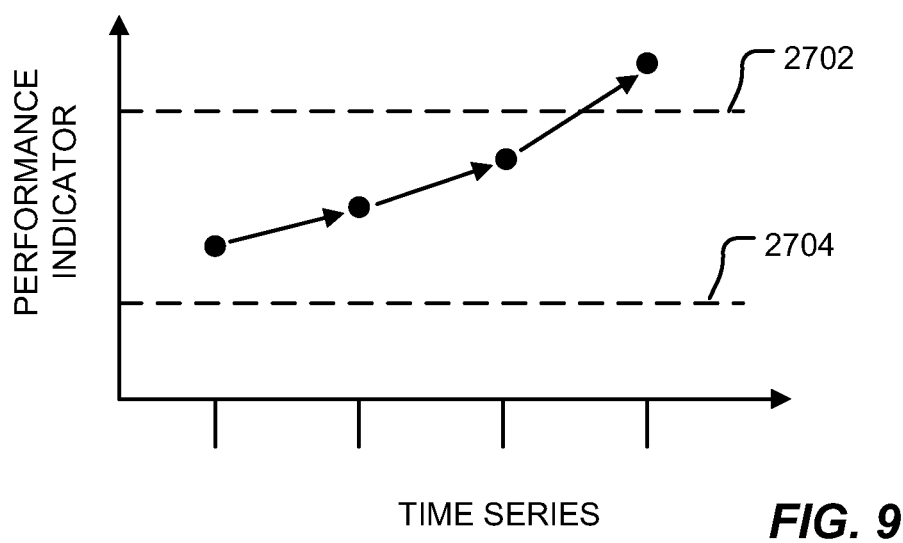
FIG. 9 includes a graph illustration of an exemplary relationship between a performance indicator and time.

To conceptually illustrate the iterations to determine a desirable set of future actions to maintain a business process in compliance with business criteria, FIG. 9 includes a graph illustration of the relationship between the value of a performance indicator and time. As illustrated, with each step in time, the value of the performance indicator changes. At the fourth time step, the value of the performance indicator violates a business criterion. The business criterion is illustrated as a threshold 2702. When the value of the performance indicator extends above the threshold 2702 or below the threshold 2704, the performance indicator has violated business criteria. Alternatively, the business criteria can be expressed as limits to a rate of change. In another example, the thresholds can have difference values at different times.

Figure 10:
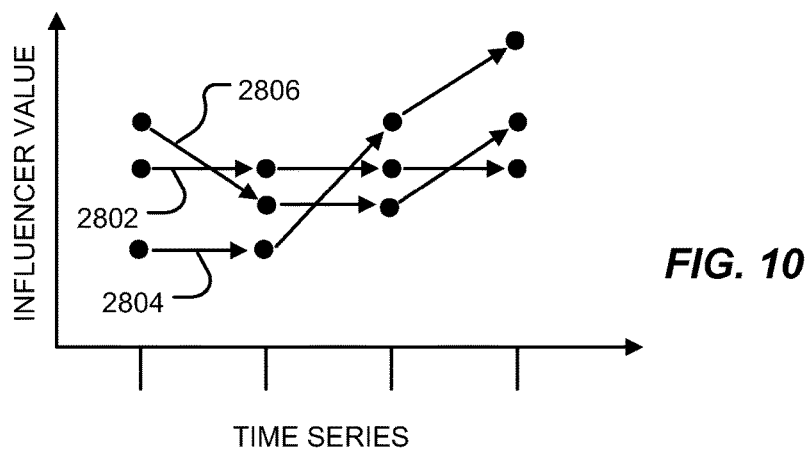
FIG. 10 includes a graph illustration of exemplary relationships between the value of influencers and time.

FIG. 10 illustrates expected influencer values over time. To more easily visualize a comparison, the values can be normalized. While a multiline chart is used to illustrate FIG. 10 for conceptual purposes, the influencer values can include categorical values, numerical values, or any combination thereof. For example, an influencer 2802 can have constant values at each of a series of time steps. In another example, an influencer 2804 can have values that increase with each subsequent time step. Alternatively, the value of an influencer can fluctuate with each time step. For example, an influencer 2806 can decrease in a first time step and increase at a subsequent time step. While the values of three exemplary influencers are illustrated, influencer values can be projected to increase, decrease, or remain the same with each time step in the time series.

In particular, the influencer values or categories can be projected based on known factors and prior history. For example, if call volume or hold time are considered influencer of customer satisfaction in a call center, it may be projected, based on past experience, that call volume and hold time increase during holiday seasons. In a field service process for a heating and air conditioning company, service calls can increase during summer months in Southern regions and increase in winter months in Northern regions. As such, embodiments of the present system can utilize manually set values of influencers, projected values of influencers, or any combination thereof.

Figure 11:
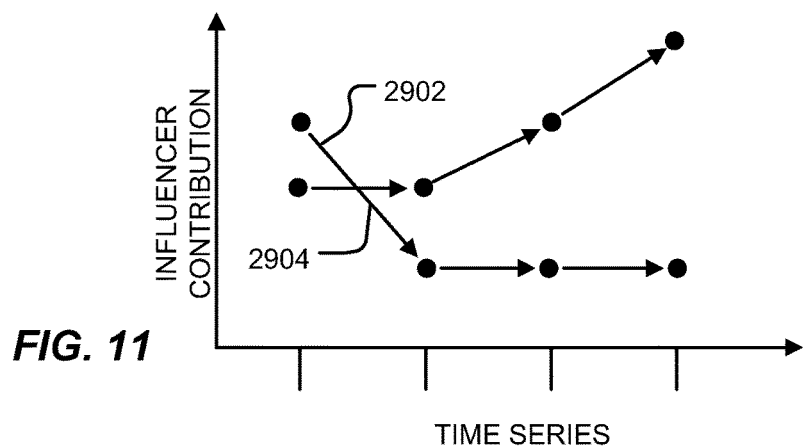
FIG. 11 includes a graph illustration of exemplary relationships between time and the contribution of an influencer to the value of a performance indicator.

Each influencer can contribute to the projected value of one or more performance indicators and each performance indicator can be a function of one or more influencers and time. In particular, determining the relationship of influencers and performance indicators includes determining the contribution of each influencer to the value of a projected performance parameter. Such conceptual contributions are in practice a model derived from data and relevant algorithms. FIG. 11 illustrates conceptually the contribution of two influencers to a projected performance indicator. In addition to the value of the influencer, the value of the performance indicator can be influenced by how much a particular influencer influences the value of the performance indicator at future time steps. For example, the contribution of an influencer 2902 to the value of a performance indicator can decrease over time. As illustrated, the value of influencer 2902 contributes significantly to the current value of the performance indicator. However, the value of the influencer 2902 contributes less to projected values of the performance indicator. In such an example, the influencer 2902 may not correlate with future values of the performance indicator. In contrast, the contribution of an influencer 2904 to the value of a performance indicator increases at subsequent time steps. For example, the value of the influencer 2904 can correlate strongly with the value of the performance indicator at a future time step.

Using the influencer values or categories, whether projected or manually set, and using the relationships of such influencer values or categories on future values of the performance indicator, the system can project performance indicator values or categories over a series of future time steps and iteratively adjust the influencer values or the occurrence of categories at future time steps to determine desirable changes to influencer values or categories at future time steps that maintain the performance indicators in balance with the business criteria.

Figure 12:
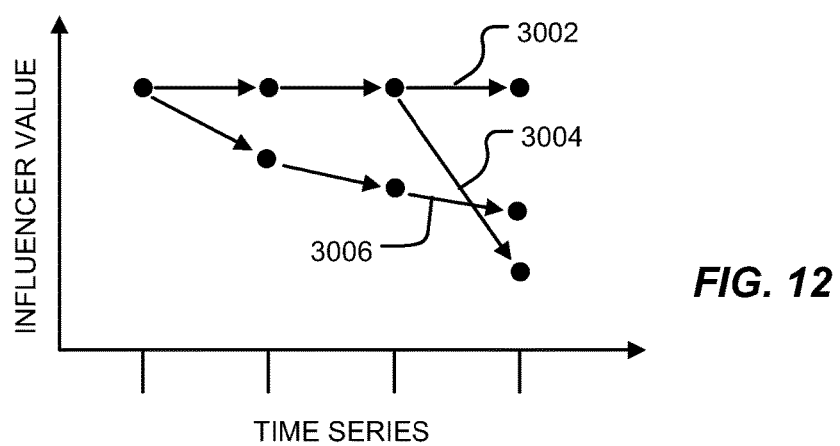
FIG. 12 includes a graph illustration of exemplary changes to the value of an influencer projected over time.

For example, FIG. 12 includes an illustration of sets of changes that can be made to the values of an influencer through a time series. In an example, the value of the influencer can be constant through time, as illustrated at 3002. Such a path (set of consecutive values of an influencer) can lead to a violation of a business criterion by performance indicators. To prevent violation of the business criterion, the influencer can be decreased at at least one future time step. For example, at a third time step the influencer can be reduced significantly, as illustrated at 3004, to prevent a violation. In another example, the influencer can be gradually reduced over a series of time steps, as illustrated at 3006. As such, different paths or sets of changes to an influencer value can be assessed to determine a preferred path that maintains the business process in compliance. In an example, such a path can be preferred because it is a lower cost solution or has advantages not present with other paths.

As such, embodiments of the present system can assist with determining a set of future actions (changes to influencers) that maintain a business process, as quantified by performance indicators, in compliance with business criteria. In other words, the present system can assist with determining which changes to make to a business process and when to make such changes.

Figure 13:
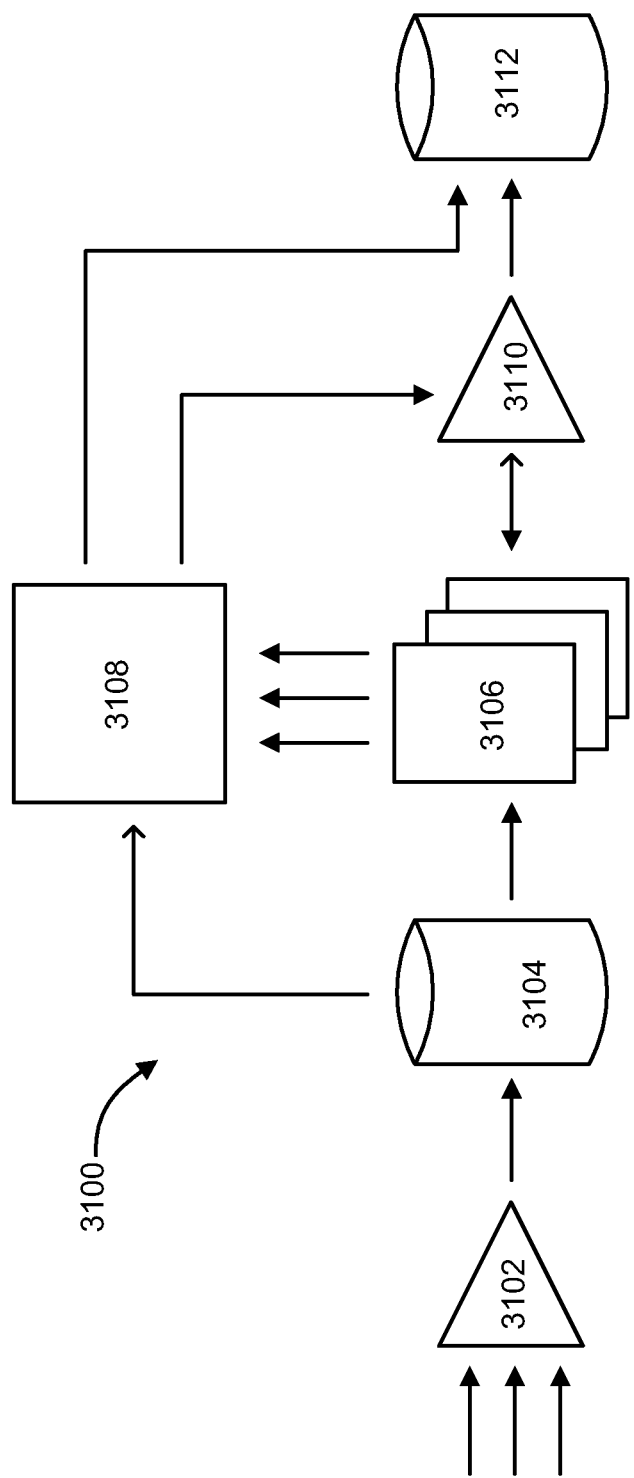
FIG. 13 includes an illustration of an exemplary process for predictive decision making.

In an embodiment illustrated in FIG. 13, the present system 3100 includes tools 3102 for processing raw data gathered from external sources. For example, the tools 3102 can assist with loading data from external sources, transforming the data into desirable formats, aggregating the data, and cleaning the data.

In particular, the data can be derived from structured sources, such as databases, tables, listings, or any combination thereof. In another example, the data can be derived from unstructured sources. Unstructured sources are sources that are interpreted using human or artificial intelligence and, for example, include video sources, audio sources, narrative text, or any combination thereof. Narrative text includes, for example, articles, blogs, emails, and other writings in prose, such as those available via the internet or electronic sources. Further, unstructured sources can include documents having narrative text and including enriched formatting, such as tags. For example, the unstructured source can include a narrative text document formulated in a hypertext, XML or tagged format. Once processed, the data is stored, for example, in a data management system, such as a database 3104.

The data and a set of algorithms 3106 can be used to prepare models. Algorithms 3106 can take the form of heuristics or the form of algorithms to form regression models, Markov chains, time series models, state space models, Bayesian models, neural networks, or any other appropriate model, or any combination thereof. In particular, exemplary algorithms 3106 include autoregressive integrated moving average (ARIMA), seasonal ARIMA (SARIMA), autoregressive conditional heteroskedasticity (ARCH), or generalized autoregressive conditional heteroskedasticity (GARCH), among others. The data can be applied though the algorithms 3106 to provide relationships and models between influencers and performance indicators, which can be validated against a test set from the original data, at validation 3108. Validation 3108 results can be used by selector 3110 to select a preferred model 3106. The model is assembled and stored in a model management system 3112, through which performance indicators can be projected and desirable paths of influencer values determined.

Once prepared, embodiments of the present system can apply new external data, in addition to existing data, to project the values of influencers and performance indicators. A user can configure the system, establishing, for example, a period over which projects are to be made, and other parameters associated with the system. In addition, embodiments of the system can assist with ranking a set of influencers based on their contribution to a particular performance indicator. A small change in a high ranking influencer can have a greater effect on a performance indicator than a large change in a low ranking influencer. Such a ranking can be used to perform root cause analysis. Further, the system can be tested for accuracy based on the model.

Figure 14:
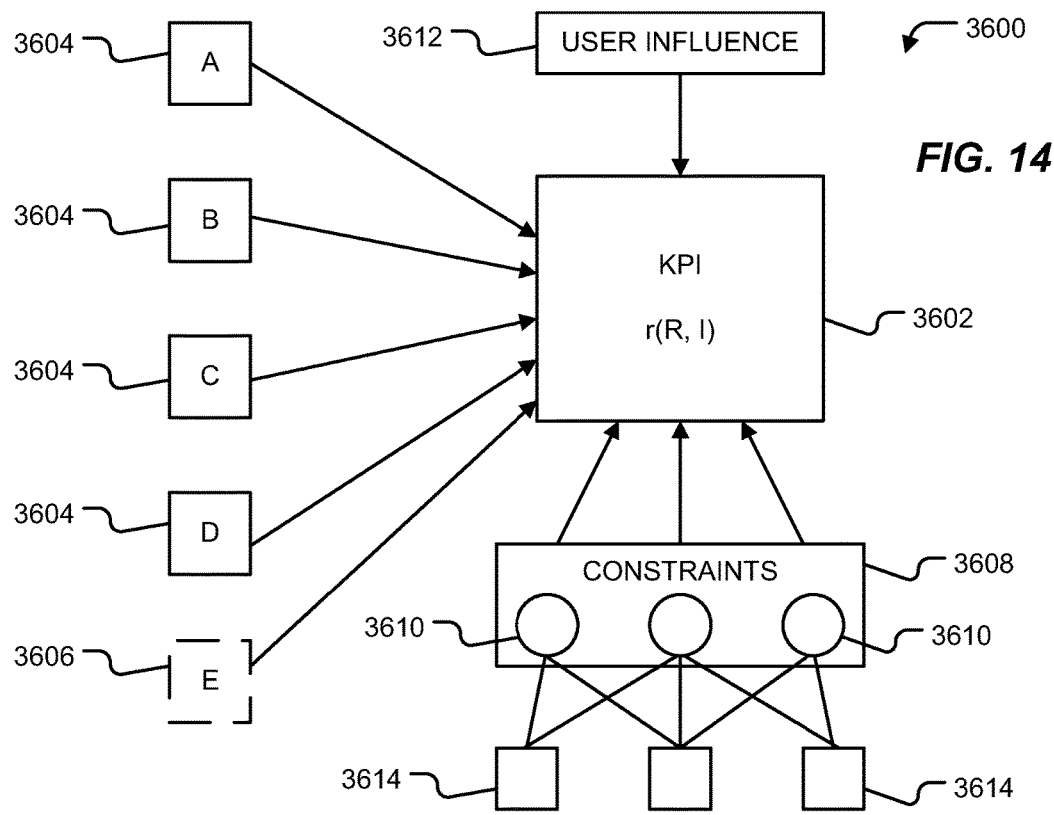
FIG. 14 and FIG. 15 include illustrations of exemplary methods for determining key performance indicator values.

In further explanation of the system, key performance indicators 3602 are influenced by influencers 3604 as constrained by constraints 3608, as illustrated in FIG. 14. Further, a user 3612 can influence the relationships established between constraints (R) and influencers (I). For example, a user can select parameters, a type of model, or other factors that influence how a relationship (r) is established between the influencers 3604, the constraints 3608, and the KPI 3602.

Such a relationship (r) permits the determination of the KPI 3602 at one or more future time periods based on present and future values of influencers 3604 subject to constraints 3608. In addition, such a relationship (r) is useful for determining the influence of small changes in the influencers 3604 on the KPI 3602 at a selected future time. As a result, root cause analysis can be performed specifically for the selected future time or generally across time periods. In addition, the system can automatically or iteratively determine a set of actionable tasks including changes to influencer values over time to provide future KPI values 3602 that do not violate business rules, subject to constraints 3608. A business rule can be a constraint. Alternatively, a business rule can be different than a constraint. In a further example, a user can manipulate one or more future values of a selected influencer 3604 to determine the effect on the future value of a key performance indicator.

The constraints 3608 can take a variety of forms including box constraints, functional constraints, quantized constraints, step constraints or any combination thereof. The constraint may not be static over time. In particular, the system can indicate that a constraint is to be changed based on auxiliary data. As a result, a constraint can evolve over time, providing an indication of new business rules or a new paradigm discovered through data provided to the system. For example, a range associated with a box constraint can be changed when a value of the KPI or an influencer is frequently in violation of limits of a box constraint. Such sticking to an upper or lower constraint can indicate that a more optimal solution is found in a different range of the influencer value. When the constraint is a function, the form of the function or the parameters associated with the function can change over time as data is provided to the system. Such constraints can also be a relationship based on business rules and performance indicators. In an additional example, a constraint can limit the range of an associated influencer based on the temporally adjacent values of the associated influencer. In an example, constraints 3610 are each influenced by external data 3614. As external data is provided to the constraints 3610, constraints can change or can provide a user with an indication that the constraint should be reconsidered. In such a manner, new business rules can be discovered, preconceived notions of doing business can be reevaluated, and adjustments to the constraints can be considered.

Determining whether to change a constraint or other rules within the system can be performed utilizing meta-rules. Meta-rules can apply a generalize rule to constraints based on the type of constraint or the behavior of data associated with the constraint. For example, when a prescribed influencer is at the top or the bottom of a box constraint for a set number of times, the system can indicate that the constraint should be reconsidered. In another example, when an influencer exhibits erratic changes providing a high variance in influencer values, the absence of a constraint or a preference for reconsidering constraints can be indicated. In such a manner, business rules and other constraints can be adaptive, compensating for changes in a business environment.

In a further example, analysis by user 3612 can influence the nature of the relationship. Using techniques, such as Bayesian networks, can indicate whether additional influencers should be included in the relationship (r). For example, analysis of the system can indicate that an additional influencer 3606 should be provided to establish a relationship (r) for determining future KPI values. As such, the system can assist with building a relationship model, selecting appropriate influencers, and introducing or removing influencers as a business environment changes or the influencers lose influence on the KPI.

Figure 15:
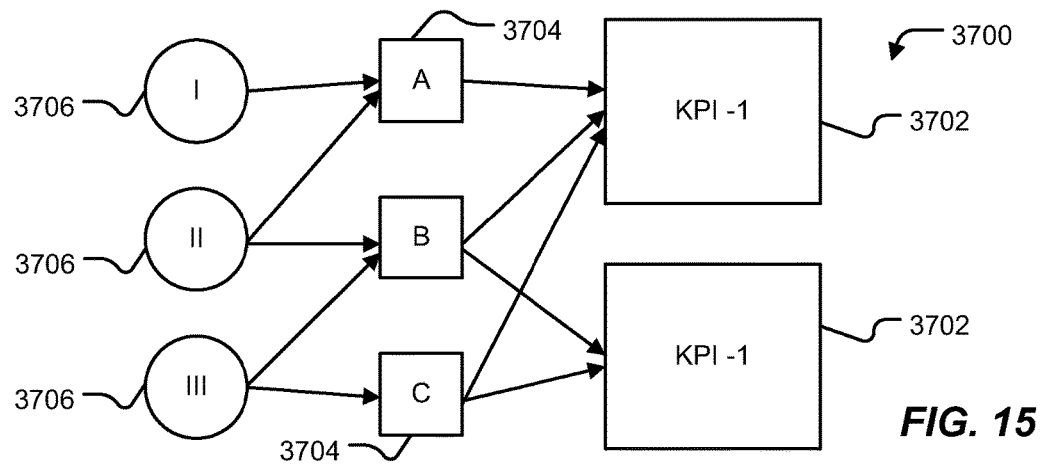

Such networks can be further utilized to translate actions 3706 into influencers 3704 that are used in relational models to determine values of the performance indicators 3702, as illustrated at FIG. 15. In particular, exemplary action hierarchies can combine user actions 3706 into differing influencers 3704 that provide relationships for determining future values of key performance indicators. In this way, the system 3700 can provide a way of translating actionable business actions to future values of key performance indicators using intermediary influencer values. When influencer values are determined for a future actionable pathway, actions 3706 can be determined from influencers 3704 and implemented by a user.

The future value of an influencer can also be limited by values of temporally neighboring future values. For example, an influencer at a first future time can limit the value of the influencer at a second future time. Such a limit can be expressed based on step limits (e.g., maximum permissible change). In another example, the limit can be expressed as a function of time. For example, limits on the value of an influencer can change based on time, either relative or according to a calendar.

When limits to influencer values are a function of time or other influencer values, optimization to achieve a desired key performance indicator value can take longer to implement. For example, when an influencer value is functionally constrained based on time, changing the value of the influencer to a substantially optimal value can be prevented until the functional constraint permits the influencer to have the substantially optimal value.

In a further example, the relationships for predicting the KPIs can be recalibrated. In particular, a trigger rule can be evaluated when new data is received. For example, a predicted value of a KPI can be compared to an actual value and when the difference is significant, such as beyond a threshold, recalibration can be triggered.

Recalibration can include adjusting parameters of a model based on new data. The system can also determine that the previous model no longer reflects the relationships between influencers and performance indicators. A model can be restructured to better reflect the relationships. In another example, a new influencer can be added to the model. In a further example, a new type of algorithm or model can be selected and the parameters determined for the new type of algorithm or model based on the new data and past data. Once recalibration is performed, the system can provide an updated prediction, root-cause analysis, or prescription.

Further, the system can provide a warning when suggested actions are not implemented. For example, when the system predicts that a future value of a key performance indicator will be in violation of a business rule and prescribes an action and when new data indicates that the action was not implemented and the key performance indicator will be in violation of the business rule, the system can provide an indication or send a message to a supervisor indicating that the actions were not taken. For example, an indication can be displayed on an interface device, sent via email, sent as a text message, or provided as a voicemail.

Figure 7:
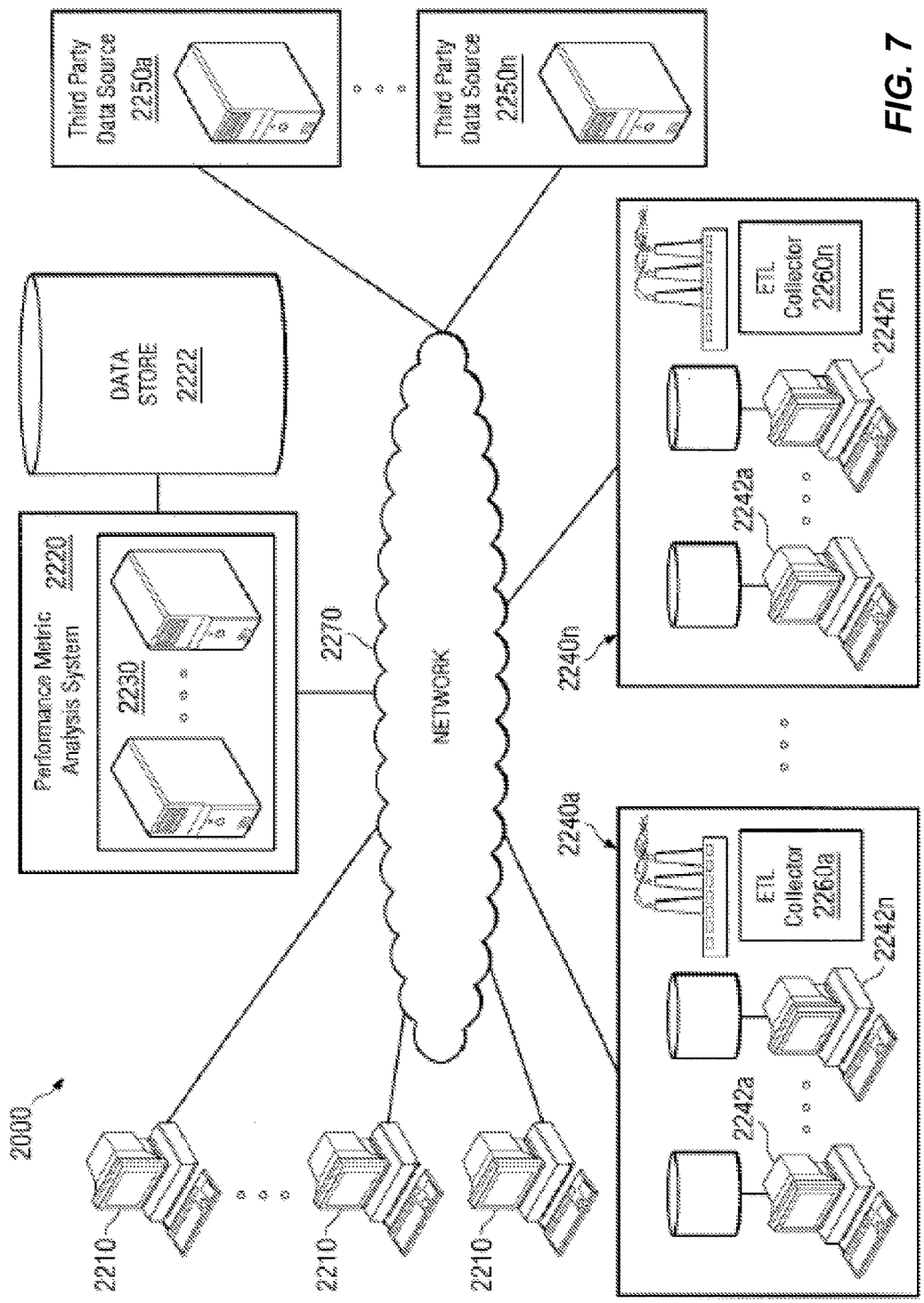
FIG. 7 is a block diagram illustrating one embodiment of a topology which can be used in conjunction with an implementation of embodiments of the present invention.

Embodiments of the systems and methods of the present invention can be better explained with reference to FIG. 7 which depicts one embodiment of a topology which can be used to implement embodiments of the systems and methods of the present invention. Topology 2000 comprises performance metric analysis system 2220 (including associated data store 2222) comprising one or more computer devices 2230. These computing devices 2230 can, for example, by organized as a cluster which can be a loosely or a tightly coupled cluster and include one or more load balancers (not shown). Performance metric analysis system 2220 (e.g. one or more of computing devices 2230) can be coupled through network 2270 to computing devices 2210 (e.g. computer systems, personal data assistants, kiosks, dedicated terminals, etc), one or more locations of an entity 2240 and one or more third party data sources 2250 operable to provide, for example, market data, benchmarking data, etc. Network 2270 can be for example, the Internet, a wide area network (WAN), a local area network (LAN) or any other type of conventional or non-electronic communication link such as mail, courier services or the like.

Generally speaking then, entity 2240 can be a business, non-profit, or other type of entity which implements a process. This process can, for example, be a business process which relates to the functionality or performance of the entity. As discussed above, for example, such business processes can comprise the implementation of customer service through a contact or call center, the implementation of transaction services, the management of supply or demand chains or other inventory management, the implementation of field services, the implementation and management of sales pipelines, etc.

No matter the type of processes implemented by the entity 2240 however, it can be useful to measure or otherwise analyze (including predicting, simulating, optimizing, etc.) the performance of such a process utilizing a performance metric, such as a KPI as discussed above. Accordingly, entity 2240 can desire to utilize and monitor these performance metrics related to these processes for a variety of reasons, including improving the performance of such processes, reducing the cost of implementing such processes, controlling the quality of such processes, preempting issues which can occur in the future with respect to these processes, substantially optimizing solutions to future problems and predicatively determine the effect of certain solutions to anticipated future problems, etc.

To that end, performance metric analysis system 2220 can gather data from entity 2240 or a third party data source 2250 to analyze such data to perform analysis on such data and can present an interface such that one or more users at computing devices 2210 can determine what analytics are utilized, the data used for these analytics, view, or affect the results, of such analytics, etc. Embodiments of such interfaces have been discussed previously herein.

More specifically, in one embodiment, performance metric analysis system 2220 can implement a set of analytics comprising at least predictive analytics, root-cause analytics, optimization and what-if simulation. Colloquially speaking, predictive analytics allows users (for example, associated with entity 2240) to identify and quantify problems (including opportunities) related to one or more performance metrics, root-cause analysis allows users to identify, quantify and rank influencers of performance metrics which can cause any upcoming problems, optimization can determine substantially optimum solution to preempt (or benefit from) any determined upcoming problems and what-if simulation allows a user to determine the effect of prescribed solutions on performance metrics.

To implement such analytics, performance metric analysis system 2220 can gather data directly or indirectly related to one or more performance metrics from entity 2240. Entity 2240 can have multiple locations 2240a, 2240n where each entity location 2240a, 2240n can comprise multiple servers or other types of computing devices 2242 which are involved in the implementation of the process by the entity 2240 or the storage of data involved with the implementation of the process. In some instances, entity locations 2240a, 2240n can have computing devices which run according to different operating systems or protocols, or which implement different types of applications or databases in conjunction with the process.

Each entity location 2240a, 2240n can have an associated ETL collector 2160 which is responsible for collecting appropriate data regarding the process or one or more associated performance metrics from various computing devices 2242 utilized in the implementation of the process or used to store data involved with the implementation of the process. ETL collector 2260 can send the data gathered at the corresponding entity location 2240 to the performance metric analysis system 2220 in response to a request from the performance metric analysis system 2220.

Thus, performance metric analysis system 2220 can, based upon one or more schedules, send out requests to each ETL collectors 2260 at each of the entity locations 2240a, 2240n and receive, in response, a set of data corresponding to that performance metric and that entity location 2240a, 2240n collected over a certain time period. This data can be stored in data store 2222. Analytics can then be performed by the performance metric analysis system 2220 using the data gathered from the entity locations 2240a, 2240n. The analytics performed by performance metric analysis system 2220 can be determined, at least in part, by a users interaction with an interface presented by performance metric analysis system 2220 and the results of the analytic performed can similarly be displayed to a user through the provided interface.

Not all of the various entities depicted in topology 2000 are necessary, or even desired, in embodiments, and that certain of the functionality described with respect to the entities depicted in topology 2000 can be combined into a single entity or eliminated altogether. The topology 2000 is therefore exemplary only and should in no way be taken as imposing any limitations on embodiments of the present invention.

Each of the above disclosed methods can be performed on multiple systems. For example, the methods can include processing data streams from a file system. The file system can be distributed, particularly for large data sets. A method can be partitioned in such a way, that it can perform the operations on a partition or subset of the data. Such processing is particularly useful for unstructured data sources having large file size. The results of such processes can be combined in such a way that the result is identical to the method applied to a single data source being combined of all of the partitioned data.

In different embodiments, any presently-disclosed apparatus (or any presently disclosed computer product including a computer usable medium) can be configured or operative to any presently disclosed method or technique.

A computer program product, includes a computer usable medium having a computer readable program code non-transitorily embodied therein, said computer readable program code adapted to be executed to implement a method as described above.

In the present disclosure, certain routines for calculating data or displaying data may be carried out 'in accordance with' a certain factor—for example, influencer identifiers may be ordered or selected in accordance with magnitudes of one or more deviations. When a routine is carried out 'in accordance with' a certain factor or factors, the routine can also be carried out in accordance with one or more 'additional factors' or additional business rules (for example, displayed identifiers may be ordered both according to magnitudes of deviations as well as whether or not the influencer is designated as an 'external influencer' or a 'controllable influencer.'). In the present disclosure, the phrase 'in accordance with' (or 'according to') should be interpreted as 'at least in part in accordance with.'

As described above, "controllable influencers" and "actionable influencers" are analogous terms. In an example, an influencer can be a business input. For example, an influencer can be a measurable business input, such as a business input relating to an action, a business function, or other business relevant data. A key performance indicator can be a business output, such as a measurable indication of performance of a business function.

A continuous value control element is a control element that can represent many values within a range of values. An exemplary continuous value control element includes a slide element, a dial, direct input e.g., (text input), keyboard input (e.g., up or down arrows), or a combination thereof. A binary value control element is a control element that can represent one of two states. An exemplary binary value control elements includes a checkbox, toggle button, radio button, or any combination thereof. Alternatively, a tri-state control element can be used in place of a binary value control element.

In a first aspect, a method of allocating a fixed resource includes displaying an interface control in a user interface display. The interface control includes at least three continuous value control elements associated with a group including at least three categories. Each continuous value control element is associated with a value associated with a category of the group. The operator, such as the sum, of the values associated with the at least three continuous value control elements is equal to a fixed quantity. The method further includes, in response to a first user input, locking a first continuous value control element to fix the value associated with the first continuous value control element, in response to a second user input, adjusting a second continuous value control element to change the value associated with the second continuous value control element, and automatically adjusting unlocked continuous value control elements of the at least three continuous value control elements other than the second continuous value control element to maintain the operator of the values associated with the at least three continuous value control elements equal to the fixed quantity.

In an example of the first aspect, the method further includes, in response to a third user input, unlocking the first continuous value control element to permit the value associated with the first continuous value control element to change in response to user further input.

In another example of the first aspect and the above examples, at least two continuous value control elements remain unlocked and are automatically adjusted. For example, the values of the at least two continuous value control elements are automatically adjusted by the same quantity when the second continuous value control element is adjusted. In another example, the values of the at least two continuous value control elements are automatically adjusted by quantities to maintain a ratio when the second continuous value control element is adjusted.

In an example of the first aspect and the above examples, the continuous value control element includes a slide element, a dial, or a combination thereof In a further example of the first aspect and the above examples, the at least three continuous value control elements are slide elements displayed in a vertical format. For example, the slide elements form at least three separate columns.

In an additional example of the first aspect and the above examples, the at least three continuous value control elements are slide elements displayed in a horizontal format. For example, the slide elements form at least three separate rows.

In another example of the first aspect and the above examples, the interface control further includes at least three locking elements, each locking element of the at least three locking elements associated with a select continuous value control element, the first user input including changing the state of a locking element associated with the first continuous value control element. For example, the locking element is a binary value control element. In another example, the binary value control element includes a checkbox, toggle button, radio button, or any combination thereof.

In a second aspect, a method of allocating a fixed resource includes displaying an interface control in a user interface display. The interface control includes at least three separate columnar continuous value control elements associated with a group including at least three categories and including at least three locking elements. Each continuous value control element of the at least three continuous value control elements is associated with a value associated with a category of the group. Each continuous value control element is associated with a locking element of the at least three locking elements. The operator of the values associated with the at least three continuous value control elements is equal to a fixed quantity. The method further includes, in response to a user input changing the state of a locking element associated with the first continuous value control element, locking the first continuous value control element to fix the value associated with the first continuous value control element. The method also includes, in response to a user input adjusting a second continuous value control element, changing the value associated with the second continuous value control element and automatically adjusting unlocked continuous value control elements of the at least three continuous value control elements other than the second continuous value control element, when at least two of the at least three continuous value control elements remaining unlocked, to maintain the operator of the values associated with the three continuous value control elements equal to the fixed quantity.

In an example of the second aspect, the method further includes, in response to a user input unchanging the state of the locking element associated with the first continuous value control element, unlocking the first continuous value control element to permit the value associated with the first continuous value control element to change in response to user further input.

In another example of the second aspect and the above examples, the at least two continuous value control elements remaining unlocked are automatically adjusted by the same quantity when the second continuous value control element is adjusted.

In a further example of the second aspect and the above examples, the at least two continuous value control elements remaining unlocked are automatically adjusted by quantities to maintain a ratio when the second continuous value control element is adjusted.

In a third aspect, a non-transitory computer readable medium stores processor operable instructions embodying a method of allocating a fixed resource. The method includes displaying an interface control in a user interface display. The interface control includes at least three continuous value control elements associated with a group including at least three categories. Each continuous value control element is associated with a value associated with a category of the group. The operator of the values associated with the at least three continuous value control elements is equal to a fixed quantity. The method further includes, in response to a first user input, locking a first continuous value control element to fix the value associated with the first continuous value control element. The method also includes, in response to a second user input, adjusting a second continuous value control element to change the value associated with the second continuous value control element. The method further includes automatically adjusting unlocked continuous value control elements of the at least three continuous value control elements other than the second continuous value control element to maintain the operator of the values associated with the three continuous value control elements equal to the fixed quantity.

In an example of the third aspect, the method further includes, in response to a third user input, unlocking the first continuous value control element to permit the value associated with the first continuous value control element to change in response to user further input.

In another example of the third aspect and the above examples, at least two continuous value control elements remain unlocked and are automatically adjusted. For example, the values of the at least two continuous value control elements are automatically adjusted by the same quantity when the second continuous value control element is adjusted. In another example, the values of the at least two continuous value control elements are automatically adjusted by quantities to maintain a ratio when the second continuous value control element is adjusted.

In an example of the third aspect and the above examples, the continuous value control element includes a slide element, a dial, or a combination thereof.

In a further example of the third aspect and the above examples, the at least three continuous value control elements are displayed in a vertical format. For example, the at least three continuous value control elements form at least three separate columns.

In an additional example of the third aspect and the above examples, the at least three continuous value control elements are displayed in a horizontal format. For example the at least three continuous value control elements form at least three separate rows.

In another example of the third aspect and the above examples, the interface control further includes at least three locking elements, each locking element of the at least three locking elements associated with a select continuous value control element, the first user input including changing a state of a locking element associated with the first continuous value control element. In an example, the locking element is a binary value control element. For example, the binary value control element includes a checkbox, toggle button, radio button, or any combination thereof.

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of allocating a fixed resource, the method comprising:
   displaying an interface control in a user interface display, the interface control including
   at least three continuous value control elements associated with a group including at least three categories, each continuous value control element associated with a value associated with a category of the group, an operator of the values associated with the at least three continuous value control elements equal to a fixed quantity, each continuous value control element including a value slide, a lower bound slide and an upper bound slide, the value slide illustrating the current value of the each continuous value control element and movable to adjust the current value, the lower bound slide illustrating a lower boundary to the current value and the upper bound slide illustrating an upper boundary to the current value;
   in response to a first user input, locking a first continuous value control element to fix the value associated with the first continuous value control element;
   in response to a second user input, adjusting a second continuous value control element to change the value associated with the second continuous value control element;
   automatically adjusting at least two remaining unlocked continuous value control elements of the at least three continuous value control elements other than the second continuous value control element to maintain the operator of the values associated with the at least three continuous value control elements equal to the fixed quantity, the adjusting illustrated as a change in position of the value slides associated with the unlocked continuous value control elements: and
   automatically adjusting the lower bound slide and the upper bound slide of the unlocked continuous value control elements based on the fixed value of the locked first continuous value control element.

2. The method of claim 1, further comprising, in response to a third user input, unlocking the first continuous value control element to permit the value associated with the first continuous value control element to change in response to user further input.

3. The method of claim 1, wherein the values of the at least two continuous value control elements are automatically adjusted by the same quantity when the second continuous value control element is adjusted.

4. The method of claim 1, wherein the values of the at least two continuous value control elements are automatically adjusted by quantities to maintain a ratio when the second continuous value control element is adjusted.

5. The method of claim 1, wherein the continuous value control element includes a slide element, a dial, or a combination thereof.

6. The method of claim 1, wherein the second user input includes direct input, keyboard input, gesture inputs, mouse inputs, voice inputs, video inputs, network inputs, digital or analog inputs from devices connected to the display or a combination thereof.

7. The method of claim 1, wherein the at least three continuous value control elements are slide elements displayed in a vertical format.

8. The method of claim 7, wherein the slides elements form at least three separate columns.

9. The method of claim 1, wherein the at least three continuous value control elements are slide elements displayed in a horizontal format.

10. The method of claim 9, wherein the slide elements form at least three separate rows.

11. The method of claim 1, wherein the interface control further includes at least three locking elements, each locking element of the at least three locking elements associated with a select continuous value control element, the first user input including changing a state of a locking element associated with the first continuous value control element.

12. The method of claim 11, wherein the locking element is a binary value control element.

13. The method of claim 12, wherein the binary value control element includes a checkbox, toggle button, radio button, or any combination thereof.

14. A method of allocating a fixed resource, the method comprising:
displaying an interface control in a user interface display, the interface control including at least three separate columnar continuous value control elements associated with a group including at least three categories and including at least three locking elements, each continuous value control element of the at least three continuous value control elements associated with a value associated with a category of the group, each continuous value control element associated with a locking element of the at least three locking elements, the operator of the values associated with the at least three continuous value control elements equal to a fixed quantity, each continuous value control element including a value slide, a lower bound slide and an upper bound slide, the value slide illustrating the current value of the each continuous value control element and movable to adjust the current value, the lower bound slide illustrating a lower boundary to the current value and the upper bound slide illustrating an upper boundary to the current value;
in response to a user input changing the state of a locking element associated with the first continuous value control element, locking the first continuous value control element to fix the value associated with the first continuous value control element;
in response to a user input adjusting a second continuous value control element, changing the value associated with the second continuous value control element; and
automatically adjusting at least two remaining unlocked continuous value control elements of the at least three elements other than the second continuous value control element, when at least two of the at least three continuous value control elements remaining unlocked, to maintain the operator of the values associated with the at least three continuous value control elements equal to the fixed quantity, the adjusting illustrated as a change in position of the value slides associated with the unlocked continuous value control elements: and
automatically adjusting the lower bound slide and the upper bound slide of the unlocked continuous value control elements based on the fixed value of the locked first continuous value control element.

15. The method of claim 14, further comprising, in response to a user input unchanging the state of the locking element associated with the first continuous value control element, unlocking the first continuous value control element to permit the value associated with the first continuous value control element to change in response to user further input.

16. The method of claim 14, wherein the at least two continuous value control elements remaining unlocked are automatically adjusted by the same quantity when the second continuous value control element is adjusted.

17. The method of claim 14, wherein the at least two continuous value control elements remaining unlocked are automatically adjusted by quantities to maintain a ratio when the second continuous value control element is adjusted.

18. A non-transitory computer readable medium storing processor operable instructions embodying a method of allocating a fixed resource, the method comprising:
displaying an interface control in a user interface display, the interface control including at least three continuous value control elements associated with a group including at least three categories, each continuous value control element associated with a value associated with a category of the group, the operator of the values associated with the at least three continuous value control elements equal to a fixed quantity, each continuous value control element including a value slide, a lower bound slide and an upper bound slide, the value slide illustrating the current value of the each continuous value control element and movable to adjust the current value, the lower bound slide illustrating a lower boundary to the current value and the upper bound slide illustrating an upper boundary to the current value;
in response to a first user input, locking a first continuous value control element to fix the value associated with the first continuous value control element;
in response to a second user input, adjusting a second continuous value control element to change the value associated with the second continuous value control element;
automatically adjusting at least two remaining unlocked continuous value control elements of the at least three continuous value control elements other than the second continuous value control element to maintain the operator of the values associated with the at least three continuous value control elements equal to the fixed quantity, the adjusting illustrated as a change in position of the value slides associated with the unlocked continuous value control elements: and
automatically adjusting the lower bound slide and the upper bound slide of the unlocked continuous value control elements based on the fixed value of the locked first continuous value control element.

19. The non-transitory computer readable medium of claim 18, wherein the method further comprises, in response to a third user input, unlocking the first continuous value control element to permit the value associated with the first continuous value control element to change in response to user further input.

20. The non-transitory computer readable medium of claim 18, wherein at least two continuous value control elements remain unlocked and are automatically adjusted.

21. The non-transitory computer readable medium of claim 20, wherein the values of the at least two continuous value control elements are automatically adjusted by the same quantity when the second continuous value control element is adjusted.

22. The non-transitory computer readable medium of claim 20, wherein the values of the at least two continuous value control elements are automatically adjusted by quantities to maintain a ratio when the second continuous value control element is adjusted.

23. The non-transitory computer readable medium of claim 18, wherein the at least three continuous value control elements are displayed in a vertical format.

24. The non-transitory computer readable medium of claim 23, wherein the at least three continuous value control elements form at least three separate columns.

25. The non-transitory computer readable medium of claim 18, wherein the at least three continuous value control elements are displayed in a horizontal format.

26. The non-transitory computer readable medium of claim 25, wherein the at least three continuous value control elements form at least three separate rows.

27. The non-transitory computer readable medium of claim 18, wherein the interface control further includes at least three locking elements, each locking element of the at least three locking elements associated with a select continuous value control element, the first user input including changing the state of a locking element associated with the first continuous value control element.

* * * * *